C. CHRISTENSEN.
AGRICULTURAL IMPLEMENT.
APPLICATION FILED MAR. 6, 1909.
1,018,351.
Patented Feb. 20, 1912.
2 SHEETS—SHEET 1.
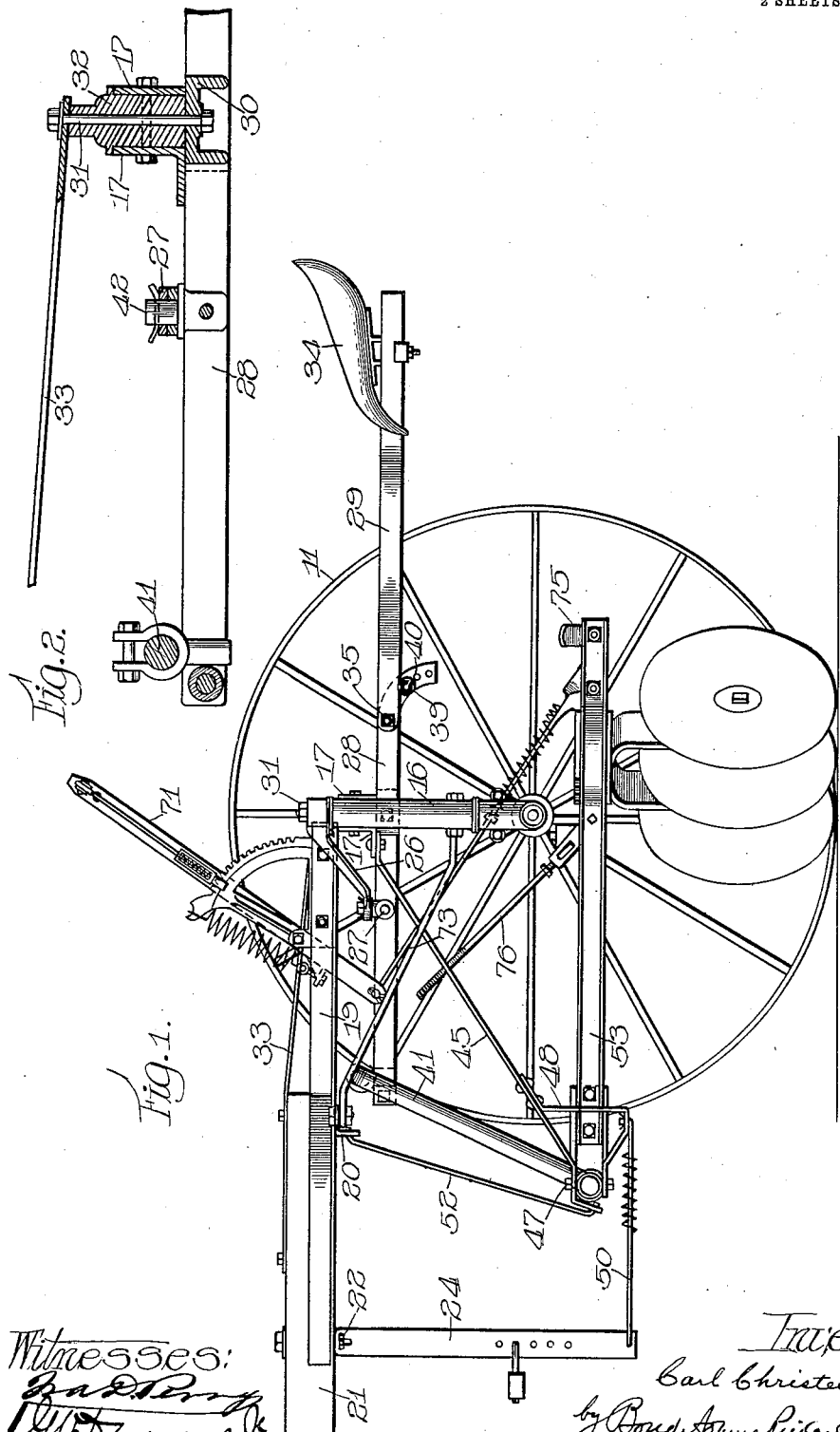

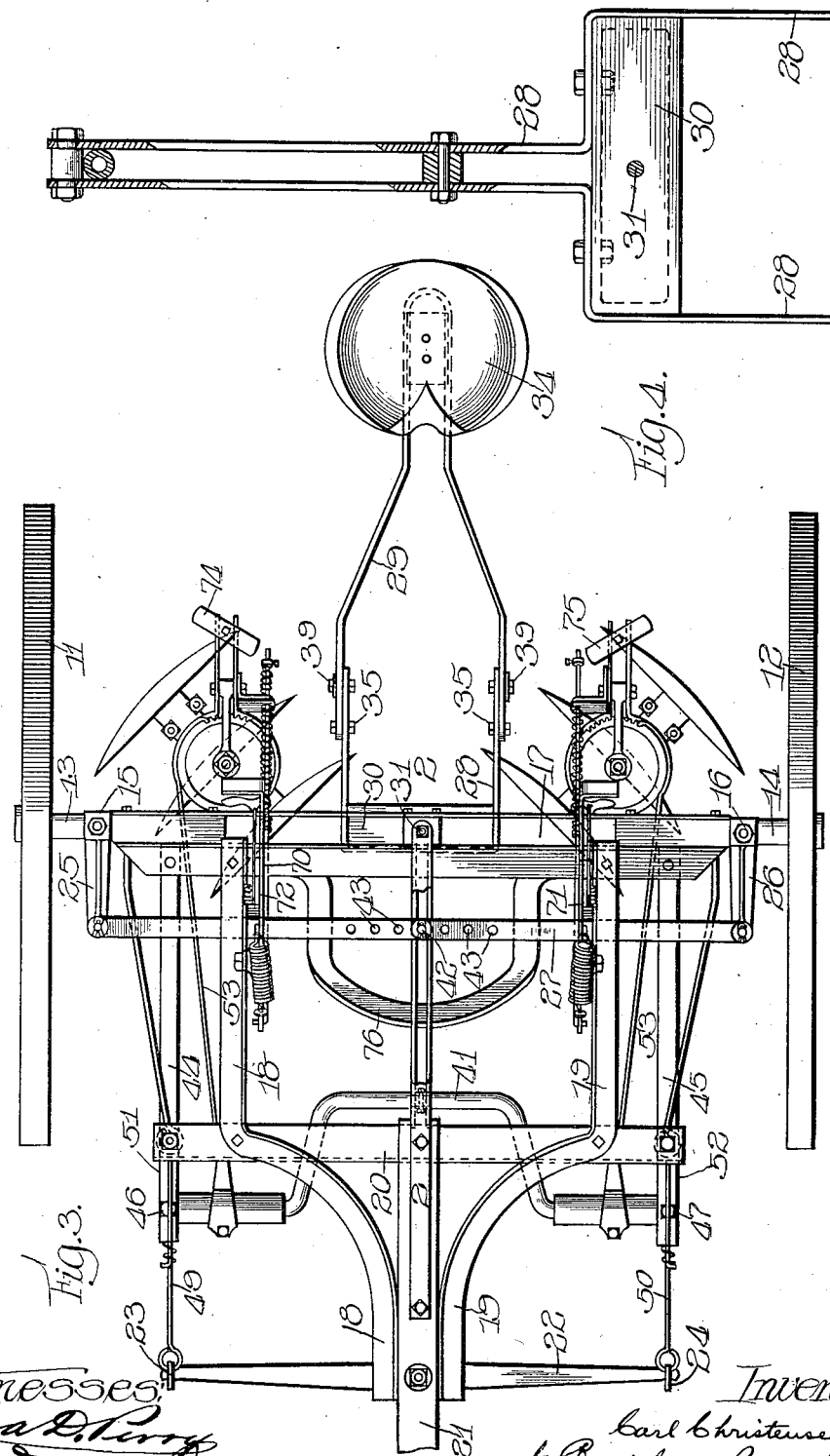

UNITED STATES PATENT OFFICE.

CARL CHRISTENSEN, OF BRADLEY, ILLINOIS, ASSIGNOR, BY MESNE ASSIGNMENTS, TO SEARS, ROEBUCK & COMPANY, OF CHICAGO, ILLINOIS, A CORPORATION OF NEW YORK.

AGRICULTURAL IMPLEMENT.

1,018,351. Specification of Letters Patent. Patented Feb. 20, 1912.

Original application filed September 25, 1907, Serial No. 394,557. Divided and this application filed March 6, 1909. Serial No. 481,758.

*To all whom it may concern:*

Be it known that I, CARL CHRISTENSEN, a citizen of the United States, residing at Bradley, in the county of Kankakee and State of Illinois, have invented certain new and useful Improvements in Agricultural Implements, of which the following is a specification, reference being had to the accompanying drawings.

My invention relates to agricultural implements of the type illustrated and described in my pending applications, Serial Nos. 332,719, filed August 30, 1906, and 394,557, filed September 25, 1907,—my present application being a division of the latter application.

It has for its object to provide certain improvements in the construction and operation of the seat-supporting devices in implements of the type referred to. I accomplish this object as illustrated in the drawings and as hereinafter described.

What I regard as new is set forth in the claims.

My improved cultivator, generally speaking, comprises a suitable frame having wheels which are arranged to swing laterally about vertical axes so as to run the machine to one side or the other,—the furrow-opening devices being correspondingly shifted by reason of the connection of the beams which carry them by laterally-rigid connections with a front arch which is itself guided laterally by means of thrust-bars pivoted at their rear ends to the frame and at their forward ends to the arch. The wheels are connected to swing in parallelism and are swung laterally, and at the same time the front arch is shifted laterally by means of their connection with a laterally-swinging seat-support pivoted upon the frame and connected at or near its forward end with the front arch. The seat-support is jointed so that it may be swung upward or may be adjusted to different heights, and the members thereof are spread apart so as not to impede the operator's view of the ground over which the machine is moving. The furrow-opener disks are arranged in gangs, which are adjusted not only about a vertical axis to change their angular relation to the line of draft, but also may be adjusted to cause them to tip to a greater or less extent relatively to a vertical plane. Suitable clamping mechanism is provided for clamping the disks rigidly in their different positions of adjustment.

In the drawings,—Figure 1 is a side elevation illustrating my improved implement; Fig. 2 is an enlarged detail, being a sectional view on line 2—2 of Fig. 3; Fig. 3 is a plan view of the implement; and Fig. 4 is an enlarged detail illustrating the construction of the forward portion of the seat supports, some parts being in section.

Referring to the drawings,—11—12 indicate the carrying wheels, which are mounted on suitable spindles 13—14 carried by vertically-placed sleeves 15—16 carried at the ends of the main arch 17. Said arch forms a part of the frame, having connected therewith side-members 18—19, which, at their forward ends, are connected by a crossbar 20. 21 indicates the tongue, which is secured betwen the forward ends of the members 18—19 and is also secured to the crossbar 20. 22 indicates a doubletree pivotally connected with the tongue in the usual way and having depending draft-straps 23—24 at its ends, as shown in Figs. 1 and 3. 25—26 indicate crank-arms secured at the upper ends of the sleeves 15—16, shown in Figs. 1 and 3, said arms extending forward from the arch 17 and being connected and held in parallelism by a crossbar 27, shown in Fig. 3. By this construction the wheels are held in parallelism at all times and swing laterally in unison. The parts thus far described are in many respects similar to the corresponding parts shown and described in my pending applications hereinbefore referred to.

28—29 indicate the front and rear members, respectively, of the seat-support. As shown in Fig. 3, and more fully shown in Fig. 4, the front member 28 of the seat-support is composed of two straps or bars arranged substantially Y-shaped, the forward portion of the frame representing the stem of the Y, the rear portions of the straps being separated at the rear and embracing a cross-head 30, best shown in Fig. 4. Said cross-head serves not only as a brace for the rear ends of said bars, but also as a means of pivotally connecting them with the frame, a pivot 31 passing through said cross-head and being connected with the frame, as shown in Fig. 2.

32 indicates a bearing-block secured to the members of the axle 17, as shown in Fig. 2, forming a bearing for the pivot 31, and 33 is a brace which connects the upper end of said pivot with the rear portion of the tongue, as shown in Figs. 1 and 3.

The rear member of the seat-support is composed of a strap or bar bent intermediately, the doubled portion forming the support for the seat 34 while the ends thereof are separated and connected with the ends of the member 28, as shown in Fig. 1. 35 indicates a pivot connecting said members, and 39 indicates bolts fitted in holes 40 in the rear ends of the member 28, which, as shown in Fig. 1, extend downwardly below the member 29 and thus provide means by which the height of the rear member of the seat-support may be vertically adjusted. When necessary, the rear member may be folded forward out of the way or it may be entirely removed, if desired. By spreading apart the intermediate portion of the seat-support the operator is given an unobstructed view of the ground over which the machine is traveling, which is quite an important advantage.

41 indicates the front arch, the upper portion of which is connected with the forward portion of the seat-support, as shown in Figs. 2, 3 and 4, so that when said seat-support is swung laterally the arch is also moved laterally.

42 indicates a pin connecting the front portion of the seat-support with the cross-bar 27, so that when said seat-support is swung laterally the wheels are turned toward one side or the other. The bar 27 is provided with a number of holes 43 so that the point of connection of the seat-support with said bar may be varied, when desired.

44—45 indicate thrust-bars pivotally connected at their rear ends with the frame of the machine and at their forward ends with the end portions of the arch 41,—46—47 indicating pivots which connect the forward ends of the thrust-bars with the arch, as shown in Figs. 1 and 3.

48 indicates hangers connected to the thrust-bars 44—45 back of the point at which they are connected with the arch 41, said hangers being connected by draft-rods 49—50 with the lower ends of the straps 23—24, as shown in Figs. 1 and 3.

51—52 indicate pendent bars or straps pivotally connected at their upper ends with the ends of the cross-bar 20 and at their lower ends with the thrust-bars 44—45, as shown in Figs. 1 and 3, thereby supporting and guiding the thrust-bars and arch 41 when they move laterally.

53 indicates the beams, which carry the furrow-openers.

As the construction of the beams and the connections by which the disk are secured thereto form no part of my present invention and are fully disclosed in my application, Ser. No. 394,557, of which this application is a division, I shall not describe them in detail herein.

70—71 indicate lifting levers pivoted to the frame of the machine and connected with the rear end-portions of the beams by connecting-rods 72—73, as best shown in Figs. 1 and 3. The levers are provided with suitable locking mechanism so that the disks may be raised and lowered and secured at different heights, as desired.

74—75 indicate footrests secured at the rear end-portions of the beams.

76 indicates an inclined arch, the rear end-portions of which are connected with the rear portions of the beams, as shown in Fig. 1, said arch extending forward and upward, as shown in Figs. 1 and 3. Said arch serves to hold the disk gangs properly apart but does not interfere with the operation of the other parts of the machine.

In operation the driver by properly directing the pressure of his feet upon the gangs may swing the seat-support to one side or the other, thereby correspondingly turning the wheels and also swinging the front arch with the beams laterally. The disk gangs may be adjusted at any desired angle to the line of draft, or may be tilted to a greater or less extent with reference to the ground, and if desired they may easily and quickly be detached from the beams. When in position, however, they are firmly secured against displacement. When desired, the seat-support can be thrown up out of the way, or, if desired, the parts thereof can be rigidly secured together, so it can be made in effect one piece throughout. The rear portion of the seat-support may also be raised or lowered to adjust the height of the seat.

The general construction of the machine is not herein claimed, as it forms the subject-matter of my pending applications hereinbefore referred to, my present invention having more particularly to do with the construction and operation of the seat-support.

That which I claim as my invention, and desire to secure by Letters Patent, is,—

1. In a seat for agricultural implements, a laterally-swinging seat-support comprising a pivoted cross-head arranged to swing about a vertical axis, a Y-shaped seat-frame between the separated rear end portions of which said cross-head is secured, and seat-supporting bars pivotally connected with said Y-shaped seat-frame and extending rearwardly therefrom.

2. In a seat for agricultural implements, a laterally-swinging seat-support comprising a pivoted cross-head arranged to swing about a vertical axis, a Y-shaped seat-frame between the separated rear end portions of which said cross-head is secured, seat-supporting bars pivotally connected with said Y-shaped bars and extending rearwardly therefrom, and means for varying the angular position of said seat-supporting bars.

3. In a seat for agricultural implements, a seat-support comprising front and rear members, the front member comprising a cross-head and a Y-shaped seat-frame between the separated rear end portions of which said cross-head is secured, and seat-supporting bars pivotally connected with said Y-shaped seat-frame and extending rearwardly therefrom.

4. In a seat for agricultural implements, a seat-support comprising front and rear members, the front member comprising a cross-head and a Y-shaped seat-frame between the separated rear end portions of which said cross-head is secured, the rear end portions of said seat-frame being turned down, seat-supporting bars pivotally connected with said Y-shaped seat-frame and extending rearwardly therefrom, and means carried by the downwardly-extending portions of said Y-shaped seat-frame for supporting said supporting-bars.

CARL CHRISTENSEN.

Witnesses:
NELS JORGENSEN,
JENS P. JENSEN.

---

Copies of this patent may be obtained for five cents each, by addressing the "Commissioner of Patents, Washington, D. C."